(12) United States Patent
Zitelli

(10) Patent No.: US 12,122,090 B2
(45) Date of Patent: Oct. 22, 2024

(54) METHOD AND APPARATUS FOR ISOTROPIC STEREOLITHOGRAPHIC 3D PRINTING WITH A VARIABLE SPEED AND POWER HYBRID LIGHT SOURCE

(71) Applicant: AXTRA3D INCORPORATION, Dover, DE (US)

(72) Inventor: Gianni Zitelli, Padua (IT)

(73) Assignee: AXTRA3D INCORPORATION, Dover, DE (US)

( * ) Notice: Subject to any disclaimer, the term of this patent is extended or adjusted under 35 U.S.C. 154(b) by 152 days.

(21) Appl. No.: 17/801,049

(22) PCT Filed: Feb. 22, 2021

(86) PCT No.: PCT/IT2021/050037
§ 371 (c)(1),
(2) Date: Aug. 19, 2022

(87) PCT Pub. No.: WO2021/166005
PCT Pub. Date: Aug. 26, 2021

(65) Prior Publication Data
US 2023/0084828 A1 Mar. 16, 2023

(30) Foreign Application Priority Data
Feb. 21, 2020 (IT) .................. 102020000003653

(51) Int. Cl.
*B29C 64/135* (2017.01)
*B29C 64/255* (2017.01)
(Continued)

(52) U.S. Cl.
CPC .......... *B29C 64/135* (2017.08); *B29C 64/255* (2017.08); *B29C 64/268* (2017.08);
(Continued)

(58) Field of Classification Search
CPC ........ B29C 64/135; B33Y 10/00; B33Y 30/00
See application file for complete search history.

(56) References Cited

U.S. PATENT DOCUMENTS

| 6,241,934 B1 | 6/2001 | Everett et al. |
| 2017/0326786 A1 | 11/2017 | Yuan et al. |

(Continued)

FOREIGN PATENT DOCUMENTS

| CH | 713258 A2 | 6/2018 |
| WO | 2017056124 A1 | 4/2017 |

OTHER PUBLICATIONS

International Search Report and Written Opinion issued on Jun. 10, 2021 of corresponding International Application humber PCT/IT2021/050037, 14 pgs.

(Continued)

*Primary Examiner* — Edmund H Lee
(74) *Attorney, Agent, or Firm* — Maier & Maier, PLLC

(57) ABSTRACT

An apparatus for 3D printing of the bottom-up photo-curing type, including a first source of photo-curing radiation, of the DLP type, having a predetermined wavelength, and a second source of photo-curing radiation, of the laser type, having a wavelength equal to that of the first source, the second source using laser deflection and a polarisation coupling optic, the first source having linear polarisation oriented according to a predetermined angle, and the second source having linear polarisation oriented according to an angle orthogonal to that of the first source; the second source having variable irradiating flux power and the laser deflection having variable speed, the irradiating flux power and speed of the laser deflection controlled by predictive software as a function of the time required for photo-curing of (Continued)

each layer by the first source. Embodiments also relate to a method of 3D printing of the bottom-up photo-curing type using the apparatus.

8 Claims, 2 Drawing Sheets

(51) Int. Cl.
*B29C 64/268* (2017.01)
*B29C 64/277* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC .......... *B29C 64/277* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2018/0169969 A1* | 6/2018 | Deleon | ................. B29C 64/268 |
| 2018/0215093 A1 | 8/2018 | Chimmalgi | |
| 2019/0126535 A1* | 5/2019 | Thompson | ............. B33Y 30/00 |
| 2019/0232559 A1* | 8/2019 | Thompson | ............. B33Y 30/00 |

OTHER PUBLICATIONS

Italian Search Report and Written Opinion issued on Nov. 4, 2020 of corresponding Application No. 102020000003653, 10 pgs.

* cited by examiner

METHOD AND APPARATUS FOR ISOTROPIC STEREOLITHOGRAPHIC 3D PRINTING WITH A VARIABLE SPEED AND POWER HYBRID LIGHT SOURCE

FIELD

This invention relates to a predictive method and a relative apparatus for isotropic stereolithographic 3D printing, with a hybrid light source with variable speed and power.

More specifically, the invention relates to an innovative method of producing three-dimensional objects, by means of a process of photo-curing photosensitive materials, which allows three-dimensional objects to be produced according to a sequential formation process, considerably increasing the speed, the precision and the mechanical qualities of the final product, compared with what can be obtained by means of prior art methods.

The invention relates to the field of three-dimensional printing, commonly referred to as 3D printing, and in particular to the technology of 3D printing by photo-curing, that is to say, curing of a particular type of polymer by exposure to light radiation.

BACKGROUND

It is known that there are two basic technologies in the field of 3D printing by photo-curing: stereolithographic printing (also called SLA, StereoLithography Apparatus), in which a laser emitting around 400 nm is used to solidify a photo-curing polymer in the liquid state, which is contained in a special tank, by means of the emitted beam; and DLP (Digital Light Processing) printing, in which a photo-curing polymer (or photo-curing liquid resin), also in a liquid state in a tank, is exposed to the light radiation emitted by a device similar to a projector. A variant of DLP printing consists of the printing obtained by irradiation from a liquid crystal source, for which the acronym LCD (Liquid Crystal Display) is commonly used.

According to all these technologies, the printing process proceeds by making one layer after another, that is to say, by solidifying a first layer adhering to a support plate (or extraction plate) and then a second layer adhering to said first layer and so on until the formation of the complete object. According to this technology, therefore, the data representing the three-dimensional object to be produced is organised as a series of two-dimensional layers representing cross-sections of the object.

According to the Bottom-Up process, which is applied to both SLA and DLP machines, as well as the LCD type machines, the extraction plate of the object moves from the bottom upwards, with a layer-by-layer tilting motion.

In essence, the process of forming the three-dimensional object is as follows:
- a software subdivides the 3D model, supplied as input for the printing, into an ordered succession of layers, the thickness of which is determined as a function of the technology adopted, the opacity of the polymer, the quantity of catalyst, the degree of precision to be achieved and the characteristics of the machine in use, usually between 50 and 200 microns, but, in any case, a succession of a discrete and finite number of layers;
- a support plate, also known as an extraction plate, made of a material that facilitates the sticking of the first polymer layer on itself, is brought to a predefined distance from the first layer and waits for the light beam (SLA or DLP/LCD) to solidify the first layer; It is then raised a sufficient distance so that the newly formed layer detaches from the bottom of the tank (usually approximately 1 mm) and then lowered by the same distance, minus the distance set for the formation of the second layer, and so on until the entire object is formed.

The resulting back-and-forth movement, also known as a tilting movement, has two main purposes: it allows the newly formed layer to detach itself from the bottom of the tank, and at the same time it allows a new quantity of un-polymerised liquid resin to interpose itself between the newly formed layer and the bottom of the vessel, to allow the renewal of material still in a liquid state under the already solidified layer, for the curing and the formation of the next layer.

Moreover, as is known, the different light sources, whether they are laser, DLP or LCD, give different mechanical behaviours to the printed object, and in particular introduce in the printed object a diversification of the physical/chemical/mechanical behaviours in the three spatial dimensions XYZ due to the different curing modes of the single layers, which entails a spatial diversification of the chemical bonds being formed.

For this reason, except in the case of printing with continuous DLP systems, as for example described in patent WO2017056124, mechanically and physically isotropic objects cannot be obtained with the other printing methods.

Firstly, it should be considered that, on average, an object being formed can be considered "cured", that is to say, able to maintain the desired shape, when the chemical bonds which transform the liquid monomer into a solid polymer are between 75 and 85%, which is why the object formed, once washed, must undergo a further post-curing treatment to achieve definitive chemical and mechanical stabilisation (approximately 99% of the bonds).

With regard to the anisotropic characteristics of the objects obtained by 3D printing by photo-curing, the considerations to be made vary depending on the light source used: laser, DLP or LCD.

In particular, by using a laser to cure the individual layers, the process of forming the single layer continues by drawing line by line the cross-section of the object to be formed, directing the laser exactly as if it were a pencil, creating vector paths which it time fill in, with predetermined density, the desired surface.

It is clear that, when using this type of technology, the curing cannot be uniform, not only because a finite number of lines are passed along, moreover arranged to form a grid, with superposing at the points of intersection, but also because the polymerisation cannot be instantaneous and the chemical chains are therefore not bound homogeneously in any direction.

Unlike a laser, an LCD system allows the simultaneous polymerisation of an entire layer being formed. Consequently, if the LCD system were to be combined with a continuous printing process of the individual layers, it should enable an isotropic object to be produced. However, due to an inherent technological limitation of Liquid Crystal Display arrays, the object obtained is not isotropic in this case either. In fact, by using an LCD technology, a kind of non-luminous zone is generated between one pixel and the next, which corresponds to the mesh of conducting filaments which it is capable of exciting, then switching on or off each individual pixel. The shade itself creates a non-uniformity of illumination and therefore of polymerisation, which prevents the creation of isotropic objects in any direction. In addition, the LCD systems are affected by a phenomenon called aliasing, which generates an imperfection in the outer surface of the printed object and which will be examined in more detail below.

Finally, the DLP technology uses an entirely different method to generate the image. A stream of light strikes on a chip of microscopic mirrors which, tilted at 0 and 90 degrees, reflect, one pixel at a time, the image onto an optical tube. The generation of scattering phenomena at the edge between one mirror and the other, in fact make the projection homogeneous, which is why DLP is now the technology used to generate mechanically isotropic three-dimensional objects.

In particular, if this light source is combined with a continuous printing process, consistent behaviour can be achieved in the three spatial dimensions. However, even printing systems of this type are affected by the aliasing phenomenon, described below.

The aliasing phenomenon consists in the fact that objects generated by digital systems are represented by a plurality of minimal units, the smaller they are the higher is the resolution, which on the surface of the objects can be perceived, to the detriment of the smoothness of the surface itself. This phenomenon is also known in the field of 2D digital printing (and more generally in the two-dimensional digital reproduction of text or images), wherein the corresponding minimum units are called pixels and wherein the printing resolution depends on the size of the pixel, and where an edge (that is, an approximation of the edge of the image) is generated, the size of which is equal to the size of the pixels.

By using laser systems, the production of objects is particularly accurate in terms of the quality of the surface produced, even though, as described above, these objects are by definition non-isotropic (in terms of mechanical behaviour), extremely slow in production and time-varying, not only depending on the height of the object but also on the quantity of objects printed simultaneously by the same machine.

With regard to the DLP and LCD type projection systems, which allow the instantaneous curing of an entire layer of the object to be printed, and consequently guarantee a greater mechanical performance, higher speed and invariant time, these are however characterised by a kind of XY resolution of the printed object, equal to the size of the pixel actually projected. In particular, in the DLP systems, the greater the projection distance (and therefore the print area), the larger will be the size of the pixels projected, and consequently the resolution of the printed object will be lower.

The phenomenon of aliasing has only very recently begun to be perceived as significant, whereas previously it was not felt, because the inherent inaccuracies of 3D printing systems did not allow a polymerisation resolution to be achieved that would show this phenomenon on surfaces. On the contrary, the aliasing phenomenon has emerged due to the high technological and chemical accuracy and the extreme precision of characterisation of the process which have been achieved in the latest 3D photo-curing printing systems.

A method and apparatus for stereolithographic 3D printing have been proposed according to patent US2017/326786 in order to solve the aliasing problem wherein the apparatus comprises: a control platform capable of representing an object to be printed as a succession of layers, as well as subdividing each layer into a main area and edge filling areas; a processing unit of a digital light source which is controlled by the control platform and capable of emitting a first light beam, used for a corresponding main area of the layer when printing the object to be 3D printed; and a laser marking unit which is controlled by the control platform and capable of emitting a second light beam used for corresponding edge filling areas of the layer when printing the object to be 3D printed. Therefore, the solution proposed by patent US2017/326786 can not only implement the stereolithographic 3D printing of an object at high speed but also avoid the edge distortion due to the aliasing phenomenon, thereby improving the precision of the 3D printing of the surface of the objects. However, the solution proposed by patent US2017/326786 exposes the main area and the filler areas of the boundaries of each layer to two different types of light radiation, without any provision for this, with the consequence that the two areas will have different mechanical characteristics and with the likely creation of stresses inside the final object.

SUMMARY

In this context, the solution according to the invention, which proposes to obtain an isotropic type of printing without the limitations due to the aliasing phenomenon on the one hand and the loss of resolution on the other, by using a source of a hybrid type of photo-curing radiation, which can add the benefits of DLP technology to those of the laser technology.

However, as demonstrated by the limitations of the solution described in patent US2017/326786, adding the laser and DLP technologies, in particular working with the DLP technology for filling the cross-section of the object, that is to say, the inner portion of each layer, and with the laser technology for the polymerisation of the edge of the layer is not sufficient to achieve the intended aims.

In fact, if one imagines using a laser radiation source at constant power and speed to polymerise the edge of each layer and a DLP source to fill in its inner portion, firstly it would not be possible to continuously print the successive layers, since for each layer it would be necessary to wait for the time for scanning the edges of the laser beam, edges which vary from each layer to the next, with consequently variable times for the formation of each layer and the next.

Moreover, in any case, an object with isotropic characteristics would not be obtained, but in fact a discontinuity would be created in the chemical bonds between the internal pixels of each layer, cured by DLP technology, and the respective edge, cured by laser technology. In fact, the formation of chemical bonds would take place at different times and in different ways, resulting in a loss of spatial isotropy in the XY dimensions.

In this context, the solution according to the invention aims to develop a predictive method and a related apparatus for isotropic stereolithographic 3D printing with a hybrid light source with variable speed and power capable of:

resolving the aliasing effect;
enabling continuous printing;
producing isotropic objects in the XY directions (also in the Z direction for continuous printing).

These and other results are obtained according to the invention by proposing a predictive method and a relative apparatus for stereolithographic 3D printing of an isotropic type, which provides for the combination of a DLP type light source having a defined wavelength with a laser source having the same wavelength, which can vary the power of the irradiating flux and which has a galvanometric head, capable of working at variable speed, the two sources being managed by a hybrid CAD-CAM/Slicer software (for Computer-Aided Design (CAD) and Computer-Aided Manufacturing (CAM), which is also called slicer, due to the fact that the product is made in slices, that is to say, one layer at a time) of a predictive type, capable of calculating the perimeters of the layers to be cured and therefore the curing power and speed according to a series of equations explained below.

Summing up, therefore, the 3D printing apparatus according to the invention comprises a monochromatic DLP source with a defined wavelength (typically UV), a laser source with variable power and with the same wavelength as the DLP source, a variable speed galvanometric head and predictive software for evaluating the printing dynamics.

The solution according to the invention is based on the concept that a hybrid software, on the one hand of the Slicer type for generating monochromatic images for the DLP, on the other hand of the vector type for generating the laser paths relative to the lateral edges of the individual layers, evaluating for each individual layer the perimeters to be cured, is able to define the speed and power of the laser for each individual layer, in order to employ the same time and the same energy density delivered by the DLP source for curing the inner portion of the layer. This would make it possible to:

simultaneously polymerise the whole layer;
guarantee isotropic polymerisation;
ensure continuous printing using a laser (which is not possible using prior art technology);
solve the problem of the aliasing effect;
make the XY resolution independent of the size of the print area.

The aim of the invention is therefore to provide a predictive method and an apparatus for stereolithographic 3D printing with a hybrid light source at variable speed and power which enables the limitations of the prior art devices to be overcome and to obtain the technical results described above.

A further object of the invention is that said predictive method and said 3D printing apparatus can be made with substantially low costs, both with regard to production costs and with regard to operating costs.

A further aim of the invention is to propose a predictive method and an apparatus for stereolithographic 3D printing with a hybrid light source at variable speed and power that are simple, safe and reliable.

A first specific object of the invention is therefore a 3D printing apparatus of the bottom-up photo-curing type, comprising a tank containing a liquid photo-curing material, inside which is immersed at least one extraction plate, provided with means for moving with alternating rectilinear motion, along a direction perpendicular to the bottom of said tank from a position at a distance from the bottom of said tank equal to the thickness of a layer which can be obtained by photo-curing of said liquid photo-curing material, said 3D printing apparatus comprising a first source of photo-curing radiation, of the DLP type, with a predetermined wavelength, a second source of photo-curing radiation, of the laser type, with a wavelength equal to that of said first source of photo-curing radiation, of the DLP type, said second source of photo-curing radiation, of the laser type, having laser deflection means, and a polarisation coupling optic, said first source of photo-curing radiation, of the DLP type, having linear polarisation oriented according to a predetermined angle, that is to say, being associated with a polariser configured to allow only that portion of the radiation of said first source of photo-curing radiation, of the DLP type, having linear polarisation oriented according to a predetermined angle, to pass through, and said second source of photo-curing radiation, of the laser type, having linear polarisation oriented at an angle orthogonal to that of said first source of photo-curing radiation of the DLP type, that is, being associated to a polariser configured to allow only the portion of radiation of said second source of photo-curing radiation, of the laser type, having linear polarisation oriented at an angle orthogonal to that of said first source of photo-curing radiation, of the DLP type, to pass through; the bottom of said tank consisting of material transparent to both the radiations used for the photo-curing, said second source of photo-curing radiation, of the laser type, having variable irradiating flux power and said laser deflection means having variable speed, said irradiating flux power and said speed of the laser deflection means being controlled by a predictive software according to the time required for the photo-curing of each layer by said first source of photo-curing radiation, of DLP type.

Preferably, according to the invention, said material transparent to both the radiations used for photo-curing is borosilicate glass or quartz.

In particular, according to the invention, said laser deflection means may comprise a galvanometric head (18).

Moreover, according to the invention, said first photo-curing radiation source, of the DLP type, is monochromatic, preferably UV.

In particular, according to the invention, said second photo-curing radiation source, of the laser type, comprises a variable power diode.

Again according to the invention, said predictive software is CAD-CAM/Slicer software.

A second specific object of the invention is a 3D printing method of the bottom-up photo-curing type, implemented by means of the apparatus described above, and comprising the following steps:

b) lowering the extraction plate to a position wherein the last cured layer, or in its absence the lower surface of said extraction plate, is at the distance of a layer to be formed with respect to said bottom of the tank;
b) proceeding with the irradiation and the generation of a cured layer of the object to be printed;
c) lifting the extraction plate, with progressive detachment of the bottom of the tank from said cured layer;

then iteratively repeating steps a)-c) until the completion of the object to be formed, each iteration being carried out by setting the speed of said laser deflection means in such a way that they cover the edge of the layer to be formed in a time equal to the time necessary for the photo-curing of said layer by said first source of photo-curing radiation, of the DLP type, at the same time setting the power of the irradiating flux of said laser according to the set speed of said deflection means of the laser, in order to obtain the correct photo-curing of said liquid photo-curing material, by said second source of photo-curing radiation, of the laser type.

In particular, according to the invention, for each n layer being printed, the following conditions must be met:

$$v_{lasern} = L_{shapen}/t_{laser} = L_{shapen}/t_{DLP}$$

$$P_{lasern} = dE_{laser}/dL_{shape} \cdot v_{lasern}$$

where $v_{lasern}$ is the scanning speed of the laser for layer n, $L_{shapen}$ is the edge length of layer n, $t_{laser}$ is the time taken by the laser to scan the edge of layer n, $t_{DLP}$ is the persistence time of the DLP image for the photo-curing of layer n, $P_{lasern}$ is the power of the laser source for layer n, $dE_{laser}$ is the useful energy density to be transferred for the curing process and $dL_{shape}$ is the portion of $L_{shapen}$ travelled in time $dt_{dasern}$.

Furthermore, according to the invention, for each layer being printed, the following condition is also satisfied:

$$dE_{laser}/dL_{shape} = \text{cont.}$$

BRIEF DESCRIPTION OF THE DRAWINGS

The invention is now described, by way of example and without limiting the scope of the invention, according to a preferred embodiment, with reference to the accompanying drawings, in which.

DETAILED DESCRIPTION OF THE EMBODIMENTS

Figure 1:
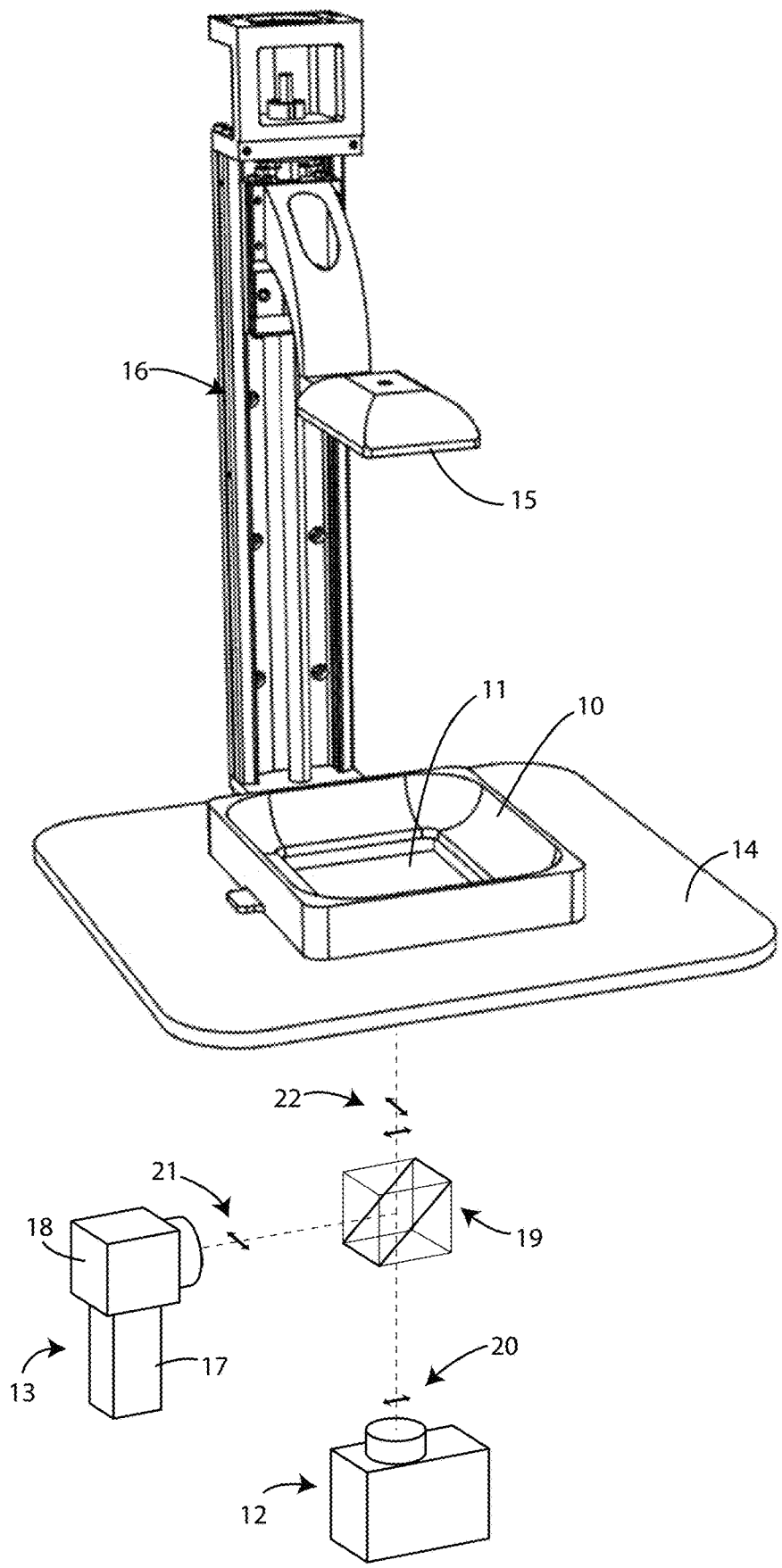
FIG. 1 shows a perspective view from above of a stereolithographic 3D printing apparatus of the isotropic type, with a hybrid light source of variable speed and power according to a first embodiment of the invention.
Figure 2:
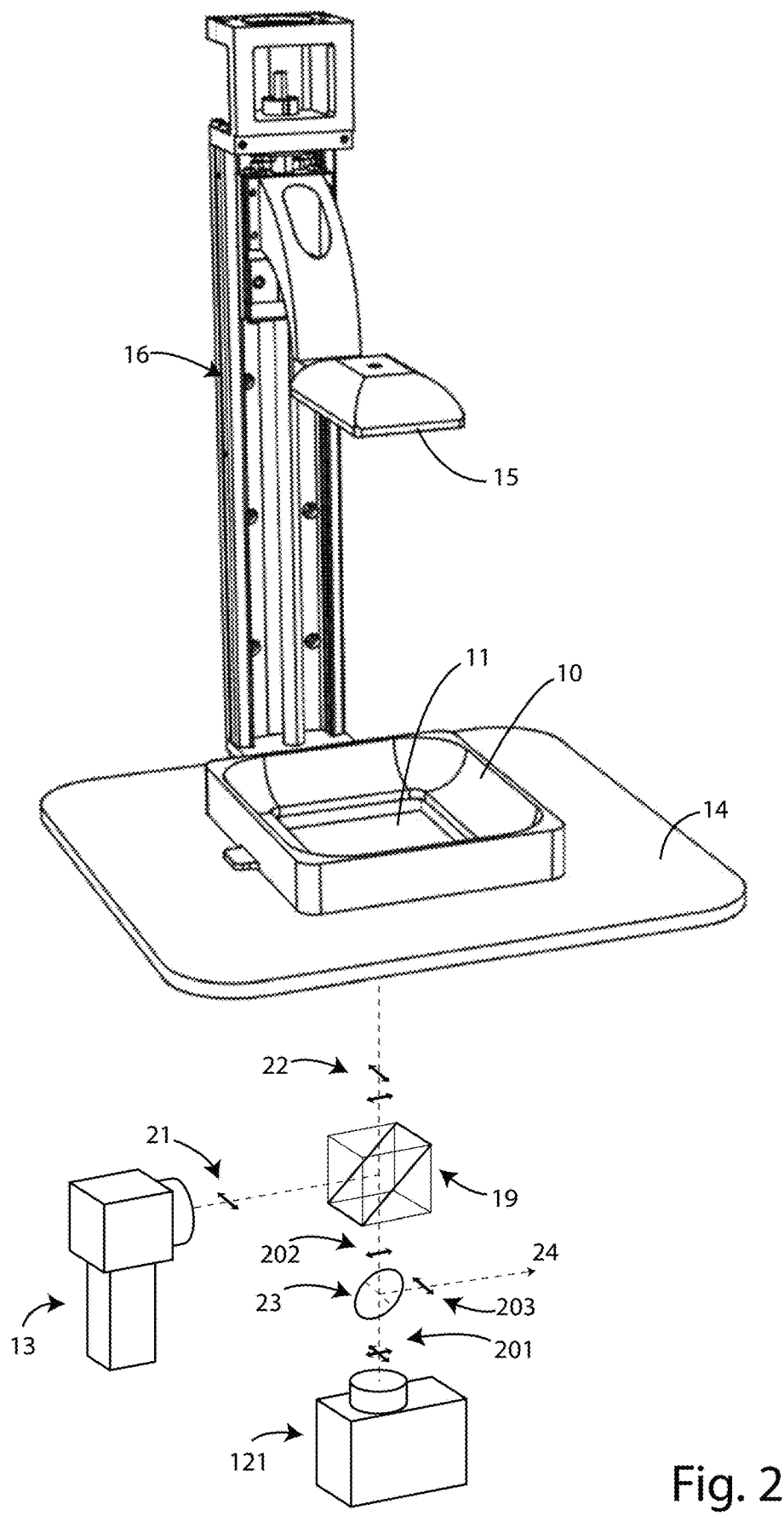
FIG. 2 shows a perspective view from above of a stereolithographic 3D printing apparatus of the isotropic type, with a hybrid light source of variable speed and power according to a second embodiment of the invention.

With reference to FIGS. 1 and 2, the elements of an apparatus for the stereolithographic 3D printing of isotropic type, with hybrid light source at variable speed and power according to the invention essentially comprise a tank 10 (which can be considered as a consumable element), designed to contain a liquid photo-curing material, the tank being equipped with a bottom 11, transparent to the radiation of a monochromatic DLP light source 12 and to the radiation of a monochromatic laser light source 13, arranged under said tank 10. The tank 10 is arranged above a support plate 14, which in the part below the bottom 11 of the tank 10 has an opening, which can be left open or can be covered with a sheet of a rigid material transparent to the radiation of the monochromatic DLP light source 12 and to the radiation of the monochromatic laser light source 13.

In particular, the bottom 11 of the tank 10 may consist of an elastic membrane of non-stick material.

The apparatus further comprises an extraction plate 15 with a respective handling and support system 16, the extraction plate 15 being designed for housing on its lower surface the first layer of the object to be printed, obtained by photo-curing of the liquid photo-curing material due to the effect of the radiation of the monochromatic DLP light source 12 and the radiation of the monochromatic laser light source 13, as will be explained in greater detail below, as well as progressively extracting said object from the tank 10, with the alternative lifting and partial lowering movement typical of 3D printing systems of the bottom-up photo-curing type.

The monochromatic light source DLP 12, suitably calibrated in terms of focus and projection distance, performs the task of curing the inner portion of each layer of the object being made, with an energy density and dwell time characteristic of each type of resin and layer thickness.

In particular, according to the invention, the monochromatic laser light source 13 is provided with a variable power diode 17 and a device designed to deflect the laser beam generated by the diode in two dimensions, in particular a variable speed galvanometric head 18, suitably calibrated in order to cure only the edge of each single layer simultaneously with the DLP source and with the same power densities and timing.

Moreover, in order to obtain isotropic objects, the monochromatic DLP light source 12 and the monochromatic laser light source 13 must also have the same wavelength, that is to say, they must have equal energy.

In order to achieve the spatial superposing of the two light beams (coaxial) whilst maintaining the same wavelength, the two beams must be polarisation-coupled using a polarising filter.

In general, assuming that it is possible to identify (or breakdown) the polarisation states of the two light beams along two directions orthogonal to each other and orthogonal to the direction of propagation of each of them, the invention proposes the use of an optic, commonly referred to as a polarisation coupling optic (polarising beam combiner), capable of transmitting one of said polarisation states (typically the so-called "p" polarisation) and reflecting the state orthogonal thereto (typically the so-called "s" polarisation).

According to the invention, referring to FIG. 1, the method and the relative apparatus for stereolithographic 3D printing of an isotropic type, based on the use of a hybrid light source, comprising a first source 12 of photo-curing radiation, of the DLP type, having a predetermined wavelength, and a second source 13 of photo-curing radiation, of the laser type, having a wavelength equal to that of said first source 12 of photo-curing radiation, of the DLP type, are spatially superimposed along a same direction of propagation by using a polarisation coupling optic 19, at the same time one of said light sources having linear polarisation oriented according to a predetermined angle and the other having orthogonal linear polarisation, in such a way that the polarisation of the light beam of one of said light sources is perpendicular to the incidence plane on said coupling optic (s-pol), the light beam being reflected, whilst the polarisation of the light beam of the other is parallel to the same plane (p-pol), the light beam being therefore transmitted. According to the embodiment shown by way of example in FIG. 1, the light beam 20 of the first source 12, of the DLP type, is parallel to the plane of incidence on the coupling optics 19 and is transmitted and the light beam 21 of the second source 13, of the laser type, is perpendicular to the plane of incidence on the coupling optics 19 and is reflected, the two beams superposing spatially, thanks to the polarisation coupling, to form a beam 22, maintaining the same wavelength.

The orientations of the polarisations of the two light beams shown in FIG. 1 are purely indicative, that is to say, they can be reversed or oriented at different angles. Similarly, the position of the first source 12, of the DLP type and of the second source 13, of the laser type, with respect to the polarisation coupling optics 19 may be inverted, the polarisation coupling optics 19 being oriented accordingly, with the aim of spatially superimposing the beams coming from the two light sources, in such a way that they have linear polarisations orthogonal to each other.

Typically, the DLP type sources used for this application emit either a linearly polarised beam in a given first predetermined direction, or a randomly polarised beam, whilst laser type sources are laser diodes which emit a linearly polarised beam in a second predetermined direction. In order to obtain the spatial superposition of the two beams, laser and DLP, it is necessary that they strike the polarisation optics with linear polarisation, one oriented perpendicular to the plane of incidence (s-pol) and the other parallel to it (p-pol). If the polarisation axes of one or both beams are not linear or are not oriented according to this definition, it is always possible to correct their orientation by using so-called "polarising" optics.

If the polarisation of the beam is linear, but oriented at an angle not adequate for striking on the polarisation optics, it is possible to rotate the orientation with a λ/2 foil with a suitably oriented optical axis. If the beam polarisation is not linear, but is circular, it is possible to transform it into linear by using a suitably oriented λ/4 foil. If the polarisation of the beam is random, it is possible to linearize and orient it by using a polariser, that is to say, a device which works on a principle similar to that of the coupling optics, but orientated in such a way that the mixed polarisation of the starting beam is broken down into its orthogonal components s and p, one of which will be reflected by the optics and the other transmitted. Depending on convenience, one of the two polarisations into which the original one has been split will be diverted to a beam collecting device (target, sensor . . . ) and will not contribute to the 3D printing process, whilst the other one will be effectively directed towards the coupling optics.

FIG. 2 shows, by way of example, an apparatus for stereolithographic 3D printing of an isotropic type, based on the use of a hybrid light source, according to an embodiment wherein the first source 121 of photo-curing radiation, of the DLP type, with predetermined wavelength, is not polarised, the light beam 201 of that light source 121 being polarised by a polariser 23, the mixed polarisation of the light beam 201 being split into a portion of the beam 203 with s-pol polarisation, which is deflected in the direction 24 towards a beam collecting device (not shown . . . ), and into a portion of the beam 202 directed towards the coupling optics 19. Indifferently, according to a different embodiment, not shown but always realised according to the invention, the source of photo-curing radiation, of laser type, may not be polarised, or both sources may not be polarised.

The polarisation beam coupling technique provides an additional and innovative advantage for a stereolithographic 3D printing apparatus of the isotropic type, with a hybrid light source, according to the invention with respect to apparatuses of a similar type according to the prior art, such as, for example, those in which the coupling of the light beams takes place in wavelength with a dichroic filter. In fact, unlike the latter, a polarisation coupling optic does not require any type of coating, and is able to guarantee the maximum degree of transmissivity for the p-polarisation and the maximum degree of reflectivity for the s-polarisation, when the beams striking on it are at the same wavelength. An example of such a type of polarisation coupling optics is the so-called Brewster foil.

The advantage of the possibly to use, if necessary, optics which do not require coating becomes apparent when the wavelength of at least one of the beams (more specifically that of the laser source, as it has a higher density) is in the UV range. In fact, the UV radiation, if it has a sufficient intensity, can trigger a phenomenon of surface degradation of the coating at its interface with the surface on which it is deposited (UV-induced optical damage), which actually creates blackening which worsens over time, as the coating itself absorbs and emphasises the UV radiation striking it.

Similarly, a Brewster foil may be used as polarisation optics along the path of one or both light beams of the hybrid light source of a stereolithographic 3D printing apparatus according to the invention, to filter out only the linear polarisation component of interest for the purpose of beam superposition in the coupling optics.

Another advantage of an apparatus for stereolithographic 3D printing with a hybrid light source according to the embodiment of the invention shown in FIG. 2 consists in the fact that, since only a portion of the beam 202 of the light beam 201 passes through the polariser 23, said polariser 23 can be used for the calibration of the stereolithographic 3D printing apparatus with hybrid light source according to the invention, so as to superpose with precision the working area covered by the light beams coming from the two light sources and avoid expensive vision systems which would prevent, for example, real-time verification of the system.

In order to guarantee correct operation of the radiation of the monochromatic DLP light source 12 and of the radiation of the monochromatic laser light source 13, the 3D printing apparatus according to the invention is equipped with a hybrid software having a hybrid slicer capable of generating for the same layer of the three-dimensional model, on the one hand, the monochromatic image to be projected with the DLP source and, on the other hand, the vector path relative to the edge of each individual layer. Once the energy density has been set, which is constant for each resin and for the thickness of each layer, the software must be able to generate in advance a sequence of instructions capable of defining the speed (a function of the curing time and the size of the path) and the power of the laser for each individual layer, as described below.

Using a standard DLP light source (projector), $t_{DLP}$ is defined as the image persistence time for polymerisation and $P_{DLP}$ is the power generated by the same projector with a predetermined wavelength (usually UV).

As is well known, for each type of resin and for each thickness of each layer associated with the same resin, we have:

$t_{DLP}$=constant;

$P_{DLP}$=constant;

that is, throughout the entire process of forming the object, having fixed the thickness of each layer, the power of the projector and the persistence time of the image associated with the n-th layer do not vary, which is why a DLP type three-dimensional printer is said to be time invariant to the volume of the object being printed.

The $t_{laser}$ time is then defined as the time taken by the laser to scan the inside to be cured, and laser $P_{laser}$ the characteristic power of the laser source at a fixed wavelength, equal to that of the DLP projector. As explained above, the wavelength of the two light sources must be the same in order to obtain an object with isotropic characteristics.

In accordance with the invention, the following condition is imposed $t_{DLP}=t_{laser}$=constant that is to say, the condition is set that for each layer the laser travel time to cure the side edges of the layer is equal to the persistence time of the image produced by the DLP projector. In other words, a condition is created whereby, whilst the DLP is curing the inside of the layer, the laser is simultaneously and in the same amount of time curing the side edges of the same layer.

This condition, if met, is necessary but not sufficient for isotropic printing, even in continuous mode. In order to guarantee this condition, $v_{laser_n}$ is defined as the laser scanning speed of the nth layer, and $L_{shape_n}$ is the edge length of each individual image n. Obviously, for each individual layer, the edge of the layer to be cured may change as the shape of the three-dimensional object changes (that is, when printing a cone, the edge length tends to decrease linearly with each successive layer).

Finally, the first mathematical condition underlying the solution according to the invention is defined. Where the speed being defined as $$v=s/t$$

in order to travel the entire length of the edge $L_{shapen}$ of the n layer in time baser, the speed $v_{lasern}$ must be equal to:

$$v_{lasern}=L_{shapen}/t_{laser}$$

and with the condition for isotropic printing $$t_{DLP}=t_{laser}=\text{constant}$$

the following is therefore obtained:

$$v_{lasern}=L_{shapen}/t_{laser}=L_{shapen}/t_{DLP}$$

that is, for each layer, as a function of the length of the edge, the speed of the galvanometer head 18 must vary linearly, in order to guarantee that the scanning time of the laser for the curing step of the edge is equal to the time taken by the DLP source to cure the inner portion of the image.

Having defined the first condition, it can be seen that, changing the route of the edge $L_{shapen}$ for each layer and having to maintain the scanning time of the laser $t_{laser}$ constant and equal to the curing time of the projector $t_{DLP}$ throughout the entire printing process, it is necessary to work on the $v_{lasern}$ speed of the galvanometric scanning head. However, in order to obtain isotropic printing, the percentage of completion of chemical cross-linking between the inner part of the layer and the edge must remain homogeneous, which means that the power density to be transferred per unit area must be constant; hence the second condition:

$$dP_{DLP}=dP_{laser}=\text{constant}$$

and as defined above, this varies from resin to resin and for each thickness of the layer, and remains constant throughout the printing process. The condition is therefore imposed that the energy transfer, defined as the amount of photons transferred in the unit of space and time, remains constant, which leads to the condition $$E=P\cdot t$$

where E is the useful energy to be transferred for the curing process, P is the power of the light source at constant wavelength and t is the energy delivery time. Thus, in the unit surface area, turning to the concept of density, we have:

$$dE=P\cdot dt$$

At this point, the first condition defines the speed of the laser as linearly dependent on the path to be scanned, so the persistence time of the laser on the surface unit is reduced in an inversely proportional manner.

If the isotropy condition is to be met, we have:

$$dE_{laser}=dE_{DLP}=\text{constant}$$

which is a characteristic condition for the entire printing process and is constant for each resin and each layer thickness:

$$dE_{laser}=P_n\cdot dt_{lasern}$$

from which it follows that, for each layer, we have $$dt_{lasern}=dL_{shapen}/v_{lasern}$$

and therefore $$dE_{laser}=P_n\cdot dL_{shapen}/v_{lasern}$$

from which the second mathematical condition underlying the solution proposed according to the invention is lastly defined.

Having therefore imposed that the energy density delivered by the laser must be equal and constant for each resin and for each layer thickness, we obtain:

$$P_{lasern}=dE_{laser}/dL_{shape}\cdot v_{lasern}$$

wherein $dE_{laser}/dL_{shape}=k$, where k is a constant value from which it is evident that, as the path to be scanned increases, and thus increasing the speed of the galvanometric head, which must in any case maintain the condition of temporal constancy of the scanning, in order to keep the transferred energy density unchanged, the laser power must vary linearly with respect to the speed.

For example, imagining that it is necessary to cure a layer with a certain path of the edge, if the second layer has twice the length of the edge, in order to keep the time unchanged, the speed must double, and therefore, since the persistence time is half the previous one, the power of the light source must also double.

In order to obtain an isotropic printing, which is continuous in all directions, without the aliasing effect, resolution unchanging with respect to the dimensions of the printing plate, the invention proposes an apparatus for 3D printing by photo-curing of bottom-up type, like the one described above with reference to FIG. 1, which comprises a hybrid light source, provided with a monochromatic DLP projector and a suitably calibrated laser source, with variable speed and power, as well as a predictive software capable of satisfying the following conditions for each layer being printed:

$$v_{lasern}=L_{shapen}/t_{laser}=L_{shapen}/t_{DLP}$$

$$P_{lasern}=dE_{laser}/dL_{shape}\cdot v_{lasern}$$

wherein $dE_{laser}/dL_{shape}=k$ for each layer, where k is a constant value.

In conclusion, by using a hybrid source and software as described above, the objectives of the invention can be achieved:
- isotropic printing in XY
- isotropic printing in Z (if continuous printing)
- eliminating aliasing effect
- possibility of continuous printing in Z.

The invention is described by way of example only, without limiting the scope of application, according to its preferred embodiments, but it shall be understood that the invention may be modified and/or adapted by experts in the field without thereby departing from the scope of the inventive concept, as defined in the claims herein.

The invention claimed is:

1. A 3D printing apparatus of the bottom-up photo-curing type, comprising: a tank containing a photo-curing liquid material, inside which at least one extraction plate is immersed, provided with means of movement with alternating rectilinear motion, in a direction perpendicular to the bottom of the tank from a position at a distance from the bottom of the tank equal to the thickness of a layer obtainable by photo-curing of the photo-curing liquid material, the apparatus for 3D printing further comprising a first source of a photo-curing radiation, of the DLP type, with a predetermined wavelength, a second source of a photo-curing radiation, of the laser type, with a wavelength equal to that of the first source of photo-curing radiation, of DLP-type, the second source of photo-curing, of laser type, provided with laser deflection means, and a polarizing beam combiner of the radiation of the first source of photo-curing radiation, of the DLP type and of the radiation of the second source of photo-curing radiation, of laser type, the first source of photo-curing radiation, of the DLP type, having linear polarization oriented according to a given angle, or associated with a polarizer configured to allow passage of only the portion of radiation of the first source of photo-curing radiation, of the DLP type, which has linear polarization oriented according to a given angle, and the second source of photo-curing radiation, of the laser type, having linear polarization oriented according to an angle orthogonal to that of the first source of photo-curing radiation, of the DLP type, or associated with a polarizer configured to allow passage of only the portion of radiation of the second source of photo-curing radiation, of the laser type, which has linear polarization oriented according to an angle orthogonal to that of the first source of photo-curing radiation, of the DLP type; the bottom of the tank formed by a material that is transparent to both radiations used for photo-curing, the second source of photo-curing radiation, of the laser type, having variable radiating flux power and the laser deflection means having variable speed, the radiating flux power and the speed of the laser deflection means controlled by a predictive software as a function of the time required for the photo-curing of each layer by means of the first source of photo-curing radiation, of the DLP type.

2. The 3D printing apparatus according to claim 1, wherein the material transparent to both the radiations used for the photo-curing is borosilicate glass or quartz.

3. The 3D printing apparatus according to claim 1, wherein the laser deflection means comprise a galvanometric head.

4. The 3D printing apparatus according to claim 1, wherein the second source of photo-curing radiation, of laser type, comprises a variable power diode.

5. The 3D printing apparatus according to claim 1, wherein the predictive software is a CAD-CAM/Slicer software.

6. A 3D printing method of the bottom-up photo-curing type, implemented by the apparatus of claim 1, comprising the following steps:

step a) lowering the extraction plate to a position where a last cured layer, or in its absence the lower surface of the extraction plate, is at the distance of a layer to be formed with respect to the bottom of the tank;

step b) proceeding, after step a), with the irradiation and the generation of one cured layer of an object to be formed;

step c) lifting the extraction plate, after step b), with progressive detachment of the bottom of the tank from the cured layer; and iteratively repeating the steps a)-c) until completion of the object to be formed, each iteration conducted by setting the speed of the laser deflection means so that it goes through the contour of the layer to be formed in a time equal to the time required for the photo-curing of the same layer by the first source of photo-curing radiation, of the DLP type, at the same time by setting the power of the irradiating flux of the laser according to the set speed of the laser deflection means.

7. The 3D printing method of the bottom-up photo-curing type according to claim 6, wherein, for each layer n being printed, the following conditions are met:

$$v_{lasern} = L_{shapen}/t_{laser} = L_{shapen}/t_{DLP}$$

$$P_{lasern} = dE_{laser}/dL_{shape} \cdot v_{lasern}$$

wherein $v_{lasern}$ is the laser scanning speed for the layer n, $L_{shapen}$ is the length of the contour of the layer n, $t_{laser}$ is the time taken by the laser to scan the contour of the layer n, $t_{DLP}$ is the time of persistence of the DLP image for the photo-curing of the layer n, $P_{lasern}$ is the power of the laser source for the layer n, $dE_{laser}$ is the useful energy density to be transferred for the curing process and $dL_{shape}$ is the portion of $L_{shapen}$ covered in the time $dt_{lasern}$.

8. The 3D printing method of the bottom-up photo-curing type according to claim 7, wherein, for each layer being printed, the following condition is met:

$$dE_{laser}/dL_{shape} = k$$

wherein k is a constant value.

* * * * *